United States Patent Office 3,378,201
Patented Apr. 16, 1968

3,378,201
METHOD FOR PRECIPITATING ATMOSPHERIC WATER MASSES
David N. Glew and Andrew E. P. Watson, Sarnia, Ontario, Canada, assignors to The Dow Chemical Company, Midland, Mich., a corporation of Delaware
No Drawing. Continuation-in-part of abandoned application Ser. No. 307,302, Sept. 9, 1963. This application Jan. 19, 1966, Ser. No. 521,495
2 Claims. (Cl. 239—2)

This application is a continuation-in-part of application Ser. No. 307,302 filed Sept. 9, 1963, now abandoned.

This invention relates to atmosphere control and more particularly is concerned with a novel process for providing nucleation in fogs, clouds and supersaturated water vapor.

Conventionally, the usual method of ice nucleation for cloud "seeding" involves dispersing a fine smoke, dust or spray of a solid substrate, silver iodide being widely used, into the cloud. This solid substrate apparently causes the water molecules to assume the ice lattice structure under the influence of its surface force field.

In this conventional process, operability is present only when cloud and fog water droplets are below the freezing point (0°) of water. Further, in the traditional aerosol treatment of cloud seeding, ice nucleation is induced heterogeneously by collision of the solid substrate particles with the water droplets. By their very nature, these conventional processes are not highly efficient.

It is a principal object of the present invention to provide a novel method for promoting nucleation of cloud and fog water droplets which is operable at temperatures above the freezing point of water.

It is also an object of the present invention to provide an efficient method for producing water precipitation from clouds, fogs and air supersaturated with water vapor wherein liquid droplets of a hydrate former are sprayed into the visible mass of water droplets or the vapor.

It is another object of the present invention to provide a novel process for cloud seeding which provides a multiplicity of low temperature nucleation sites within the mass of supersaturated water vapor or cloud of water droplets of the atmosphere thereby inducing precipitation at temperatures above the normal freezing point of water. It is an additional object of the present invention to provide a novel cloud and fog seeding method that gives homogeneous nucleation.

It is also an object of the present invention to provide a novel method for promoting cloud and fog dispersal and for inducing rain and snow precipitation from fogs, clouds and non-visible masses of air supersaturated with water vapor.

It is a further object of the present invention to provide a novel process for producing rain and/or snow from clouds, fogs and atmospheres supersaturated with invisible water vapor.

It is another object of the present invention to provide a novel process for dispersing and promoting nucleation of fogs, mists and other water and water vapor containing atmospheres for purposes of air pollution control.

It is also an object of the present invention to provide a novel method for preventing hailstone formation by nucleation and precipitation of water and water vapor from atmospheres containing this component before such atmospheres have attained component proportions and conditions which result in the formation of large, destructive hailstones.

These and other objects and advantages readily will become apparent from the detailed description presented hereinafter.

The novel process of the present invention comprises introducing into a cloud, fog, other mass of visible water droplets or ice crystals, or atmosphere supersaturated with water vapor at hydrate-forming conditions liquid droplets of a hydrate forming material capable of forming a solid hydrate and forming solid hydrate particles therein which serve as a multiplicity of nucleation sites.

The terms "atmospheric water mass" or "atmospheric water masses" as used herein are meant to describe and identify visible masses of water droplets and ice crystals such as clouds and fogs as well as atmospheres supersaturated with invisible water vapor which are suitable for treatment by the present novel process.

The term "hydrate-forming conditions" as used herein refers to those temperatures and pressures at which the hydrate is thermodynamically stable such that a solid hydrate forms when a single hydrate-former or mixture of hydrate formers are contacted with supersaturated water vapor, water droplets, dilute aqueous solution or ice. Certain of the hydrate-formers form stable hydrates at temperatures up to about 20° C. and atmospheric pressure. It is a particular advantage of the present process to provide for precipitation of "water masses" both at temperatures above the freezing point of water and at temperatures where ice or snow are produced directly.

Ordinarily, in carrying out the present process, a single hydrate-former or mixture of hydrate-formers is sprayed as liquid droplets, for example from an atomizing nozzle, into an atmospheric water mass. As these hydrate-forming liquid droplets are released, they partially evaporate thereby inducing localized supercooling within the mass. Such supercooling provides highly favorable hydrate-forming conditions and solid hydrate particles form through coalescence of the liquid droplets of hydrate-former with the further supercooled water droplets. These particles grow rapidly beyond a critical size by contact with additional water from the atmospheric water masses such that they do not evaporate thereby providing a multiplicity of nucleation sites for precipitation and dispersion of the water mass as discrete particles usually as rain and/or snow depending upon the temperature of the atmospheric water mass.

In a practical application of the present process, the hydrate-former or mixture of hydrate-formers is placed in a suitable container under pressure. Affixed to the container is an atomizing nozzle or other means for dispersing the hydrate-former as liquid droplets into an atmospheric water mass at a predetermined time and in a predetermined manner.

For cloud seeding, for example, the assembly can be carried or mounted on an aircraft. For dispersal of fog, smog or low hanging ground mist, the assembly can be carried on a motorized vehicle or a hand powered carrier, for example. Likewise, these latter water masses can be treated by low flying aircraft dispersing the droplets of hydrate-formers in accordance with the present process.

Any of a wide variety of hydrate-formers can be employed in the present process including those molecular species forming hydrates with 5.75 molecules of water per molecule of hydrate-former ($M \cdot 5.75H_2O$), those with 7.66 molecules of water per molecule of hydrate-former ($M \cdot 7.66H_2O$) and those with 17 molecules of water per molecule of hydrate-former ($M \cdot 17H_2O$) where "M" stands for a molecule of the hydrate-forming species.

Especially suitable hydrate-formers are mixtures of compounds which form stable hydrates at temperatures up to 20° C. or more at about 1 atmosphere pressure. These materials are particularly suitable for use at temperatures above the freezing point of water. Other materials, the solid hydrates of which decompose at lower temperatures, can be used for treating atmospheric water masses at correspondingly lower temperatures.

The mixed hydrate-formers offer the additional advantage of providing for the use of materials which normally are gaseous, e.g., $H_2S$, but which give mixed hydrates stable at higher temperatures. With these combinations, usually a first hydrate-forming material is admixed with a second member which is ordinarily gaseous at normal atmospheric pressure at room temperatures, e.g., 15–30° C. The resulting mixed hydrates produced by the mixtures of these hydrate formers have been found to be stable at temperatures up to about 20° C. or more.

In the actual preparation of a solid hydrate, for most efficient operation of the present novel process, the hydrate is formed at a temperature somewhat lower than its decomposition point. Very satisfactory, rapid hydrate formation is achieved, for example, by use of hydrate-forming temperatures which are as little as 10° lower than the maximum existence temperature of the solid hydrate.

Table I which follows lists a number of representative materials which form mixed hydrates with $H_2S$ and the decomposition temperature of the solid mixed hydrates produced therefrom.

TABLE I

| No. | Hydrate-Forming Component (M) | Decomposition Temp., $M.2H_2S.17H_2O$ ° C. at 1 atm. |
|---|---|---|
| 1 | Cyclopentane ($C_5H_{10}$) | 21.1 |
| 2 | Tetrahydrofuran ($C_4H_8O$) | 21.0 |
| 3 | Cyclopentane+tetrahydrofuran | 17.3 |
| 4 | Furan ($C_4H_4O$) | 15.3 |
| 5 | Ethylene oxide ($C_2H_4O$) | 13.1 |
| 6 | 1,3-dioxolane ($CH_2)_3O_2$) | 12.4 |
| 7 | Cyclohexane ($C_6H_{12}$) | 12.5 |
| 8 | Carbon tetrachloride ($CCl_4$) | 19.2 |
| 9 | 1,1,1-trichloroethane ($CCl_3CH_3$) | 18.6 |
| 10 | Chloroform ($CHCl_3$) | 16.2 |
| 11 | Methylene chloride ($CH_2Cl_2$) | 13.4 |
| 12 | Isopropyl chloride ($CH_3CHClCH_3$) | 15.5 |
| 13 | Dichlorofluoromethane ($CHCl_2F$) | 12.4 |
| 14 | Trichlorofluoromethane ($CCl_3F$) | 17.3 |
| 15 | Methylene bromide ($CH_2Br_2$) | 11.7 |
| 16 | Ethyl bromide ($C_2H_5Br$) | 12.5 |
| 17 | Ethylene chloride ($CH_2ClCH_2Cl$) | 11.0 |
| 18 | Dichlorobromomethane ($CHBrCl_2$) | 14.3 |
| 19 | Chlorobromomethane ($CH_2ClBr$) | 12.7 |
| 20 | Nitromethane ($CH_3NO_2$) | 8.3 |
| 21 | Pyrrole ($C_4H_5N$) | 7.9 |
| 22 | Ethyl iodide ($C_2H_5I$) | 10.5 |
| 23 | Isopropylbromide [$(CH_3)_2CHBr$] | 12.8 |
| 24 | Cyclopentyl chloride ($C_5H_9Cl$) | 7.8 |
| 25 | Tetrahydropyran [$(CH_2)_5O$] | 10.8 |
| 26 | Carbon disulfide ($CS_2$) | 9.5 |
| 27 | p-Dioxane [$(CH_2)_4O_2$] | 10.1 |
| 28 | Propylene oxide ($CH_2CHOCH_3$) | 9.7 |
| 29 | Acetone ($CH_3COCH_3$) | 8.9 |
| 30 | Tetrahydrothiophene [$(CH_2)_4S$] | 18.6 |
| 31 | Cyclopentanone ($C_4H_8CO$) | 11.4 |
| 32 | Cyclopentene ($C_5H_8$) | 14.7 |
| 33 | Propane | 9.5 |

Preferably for use in the present process mixtures of $C_5H_{10}+H_2S$, $C_4H_8O+H_2S$, $C_5H_{10}+C_4H_8O+H_2S$
$C_4H_4O+H_2S$, $C_4H_8S+H_2S$, $CCl_4+H_2S$, $CCl_3CH_3+H_2S$ and $CCl_3F+H_2S$ all of which undergo ready hydrate formation and have high hydrate decomposition temperatures are used in the present process.

Other materials which are gases at atmospheric pressures and ordinary temperatures can be substituted for the hydrogen sulfide in these mixtures to form the solid mixed hydrates under comparable conditions. Suitable gases include, for example, krypton, xenon, argon, oxygen, nitrogen, methane, methyl fluoride and selenium hydride.

The respective quantities of hydrate-formers to be employed in the mixtures can be varied over wide ranges. Preferably, however, about one gram mole of the first hydrate-forming component, as set forth hereinbefore, and at least about two gram moles of the second member are employed in the hydrate-forming mixtures. With these materials which can be compressed into liquids but which are gases at atmospheric pressures and temperatures above about 0° C., e.g., ordinarily these are used in large excess in the application mixture. This offers two advantages; the material serves as a propellant for injecting the hydrate-formers into the atmospheric water mass and upon evaporation it cools the liquid mixture thereby promoting the ready formation of solid hydrate particles.

For use at lower temperatures of operation, any of a variety of single hydrate-formers can be employed if desired. Table II presents a number of representative members which can be introduced as liquid droplets into an atmospheric water mass at hydrate-forming conditions to produce solid hydrate nucleation sites therein and effect precipitation of the water mass as discrete particles.

TABLE II

| No. | Hydrate Former (M) | Hydrate Decomposition Temperature ° C. at 1 atm. | Hydrate Formula $M°xH_2O$ |
|---|---|---|---|
| 1 | Hydrogen sulfide | 0.35 | $H_2S·5.75H_2O$ |
| 2 | Sulfur dioxide | 7.0 | $SO_2·5.75H_2O$ |
| 3 | Methyl bromide | 11.1 | $CH_3Br·7.66H_2O$ |
| 4 | Methyl mercaptan | 10.0 | $CH_3SH·7.66H_2O$ |
| 5 | Ethyl chloride | 4.8 | $C_2H_5Cl·17H_2O$ |
| 6 | Trichlorofluoromethane | 8.8 | $CCl_2F·17H_2O$ |
| 7 | Dichlorofluoromethane | 8.9 | $CHFCl_2·17H_2O$ |
| 8 | Monochlorofluoromethane | 10.0 | $CH_2FCl·17H_2O$ |
| 9 | Dichlorodifluoromethane | 5.0 | $CCl_2F_2·17H_2O$ |
| 10 | Cyclopentane | 7.7 | $C_5H_{10}·17H_2O$ |
| 11 | Methyl chloride | 7.5 | $CH_3Cl·5.75H_2O$ |
| 12 | Ethylene | −13.4 | $C_2H_4·7.66H_2O$ |
| 13 | Ethane | −15.8 | $C_2H_6·7.66H_2O$ |
| 14 | Propane | −11.9 | $C_3H_8·17H_2O$ |

Because of its applicability at relatively high temperatures, e.g., up to about 20° C. at 1 atmosphere pressure the present process finds application not only for cloud precipitation, in which visible water masses usually are at a relatively low temperature, but also for dispersing ground fogs, smogs and mists as well as for precipitating rain and snow from atmospheric air masses supersaturated with water vapor.

The following examples will serve to further illustrate the present invention, but they are not meant to limit it thereto.

EXAMPLE 1

A mixture of hydrogen sulfide and tetrahydrofuran having gram mole proportions of at least about 2/1 ($H_2S/C_4H_8O$) is sprayed as liquid droplets from a pressurized container into a cloud of supercooled water droplets which are at about one atmosphere pressure and a maximum temperature of about 19° C. As the hydrogen sulfide evaporates, the liquid mixture cools with water condensing and forming solid hydrate particles with the hydrate-formers.

As the hydrate particles fall freely through the cloud, they collide with additional water droplets which adhere to the cooled surface of the solid hydrate. As this agglomeration effect continues, condensed water particles are built up. These act as nucleation sites and cause further precipitation of the cloud as rain thereby serving the dual purpose of eliminating undesirable visible water masses and promoting rainfall or snow.

Similarly a mixture of hydrogen sulfide and trichlorofluoromethane at a gram mole proportion of at least about 2/1 ($H_2S/CCl_3F$) can be sprayed as liquid droplets into an atmospheric mass of water which is at a pressure of about one atmosphere and a maximum temperature of about 17.3° C. to provide precipitation and dispersal through hydrate formation.

Also, a mixture in the proportions of at least about 2 gram moles $H_2S$ to 1 gram mole $CCl_4$ can be used to promote cloud and fog dispersal when sprayed into a corresponding mass of the visible water droplets which is at a maximum temperature of about 19° C. at about 1 atmosphere pressure.

EXAMPLE 2

Liquid sulfur dioxide was sprayed in droplet form from a pressurized container into a cloud at a maximum temperature of about 7° C. and one atmosphere pressure to achieve cloud precipitation and rainfall by nucleation from the solid sulfur dioxide hydrate corresponding to the empirical formula $SO_2 \cdot 5.75H_2O$.

In a second run, nucleation and dispersal of water vapor was achieved by spraying liquid $H_2S$ from a pressurized container into a supersaturated mass of water vapor which was at a maximum temperature of about 0° C. and one atmosphere pressure.

Similar results are obtained when dichlorodifluoromethane is sprayed into a cloud having a maximum temperature of about 5° C. at normal atmospheric pressure. The solid hydrate particles, corresponding to the formula $CCl_2F_2 \cdot 17H_2O$, which are formed serve as nucleation sites for precipitation and cloud dispersal.

In a manner similar to that described for the foregoing examples any of the hereinbefore listed hydrate formers or combinations of these as set forth in Table I and II can be sprayed or otherwise injected as liquid droplets into atmospheric water masses which are at hydrate-forming conditions for the specific hydrate-former or specific combination of hydrate-formers used thereby to provide nucleation sites in the mass of water and in time effecting dispersal of the mass as rain or snow.

Various modifications can be made in the present invention without departing from the spirit or scope thereof for it is understood that we limit ourselves only as defined in the appended claims.

We claim:
1. In a process for promoting precipitation of clouds, smogs, fogs and atmospheric masses of supersaturated water vapor by contact with a hydrate-former the improvement which comprises;
    (a) spraying from a pressurized supply droplets of a mixture of $H_2S$ and a second member selected from the group consisting of cyclopentane, tetrahydrofuran, tetrahydrorothiophene, trichlorofluoromethane, carbon tetrachloride and 1,1,1-trichloroethane, said mixture having a minimum $H_2S$/second member gram molar ratio of 2,
    (b) introducing said mixture into said clouds, smogs, fogs and masses of water vapor at a maximum temperature of about 21° C. for said $H_2S$-cyclopentane mixture, about 19° C. for said $H_2S$-tetrahydrofuran mixture, about 18.5° C. for said $H_2S$-tetrahydrothiophene mixture, about 17° C. for said $H_2S$-trichlorofluoromethane mixture, about 19° C. for said $H_2S$-carbon tetrachloride mixture and about 18.5° C. for said $H_2S$-1,1,1-trichloroethane mixture when at a pressure of about 1 atmosphere thereby preparing a multiplicity of solid hydrate particles by combination of said hydrate-forming mixture with water from said clouds, smogs, fogs, and atmospheric masses of supersaturated water vapor, said solid hydrate particles serving as nucleation sites, and precipitating water from said clouds, smogs, fogs and atmospheric masses of supersaturated water vapor by means of said nucleation sites.

2. The process as defined in claim 1 wherein a mixture of $H_2S$ and tetrahydrofuran having a minimum $H_2S$-tetrahydrofuran gram molar ratio of 2 is employed, said mixture being introduced into said clouds, smogs, fogs and atmospheric masses of supersaturated water vapor at a maximum temperature of about 10° C. when at a pressure of about 1 atmosphere.

References Cited
UNITED STATES PATENTS

| | | | |
|---|---|---|---|
| 2,068,987 | 1/1937 | King | 239—2 |
| 2,232,728 | 2/1941 | Pleasants | 252—319 |
| 2,570,867 | 10/1951 | Schaefer | 239—2 |
| 2,908,442 | 10/1959 | Stone | 252—319 |
| 2,934,275 | 4/1960 | Ball | 252—319 |
| 3,058,832 | 10/1962 | Glew | 99—199 |

EVERETT W. KIRBY, *Primary Examiner.*